March 2, 1937.  A. A. KNEE  2,072,505
ANTICLOG MEANS FOR CHECK CONTROLLED APPARATUS
Filed Dec. 5, 1935   2 Sheets-Sheet 1
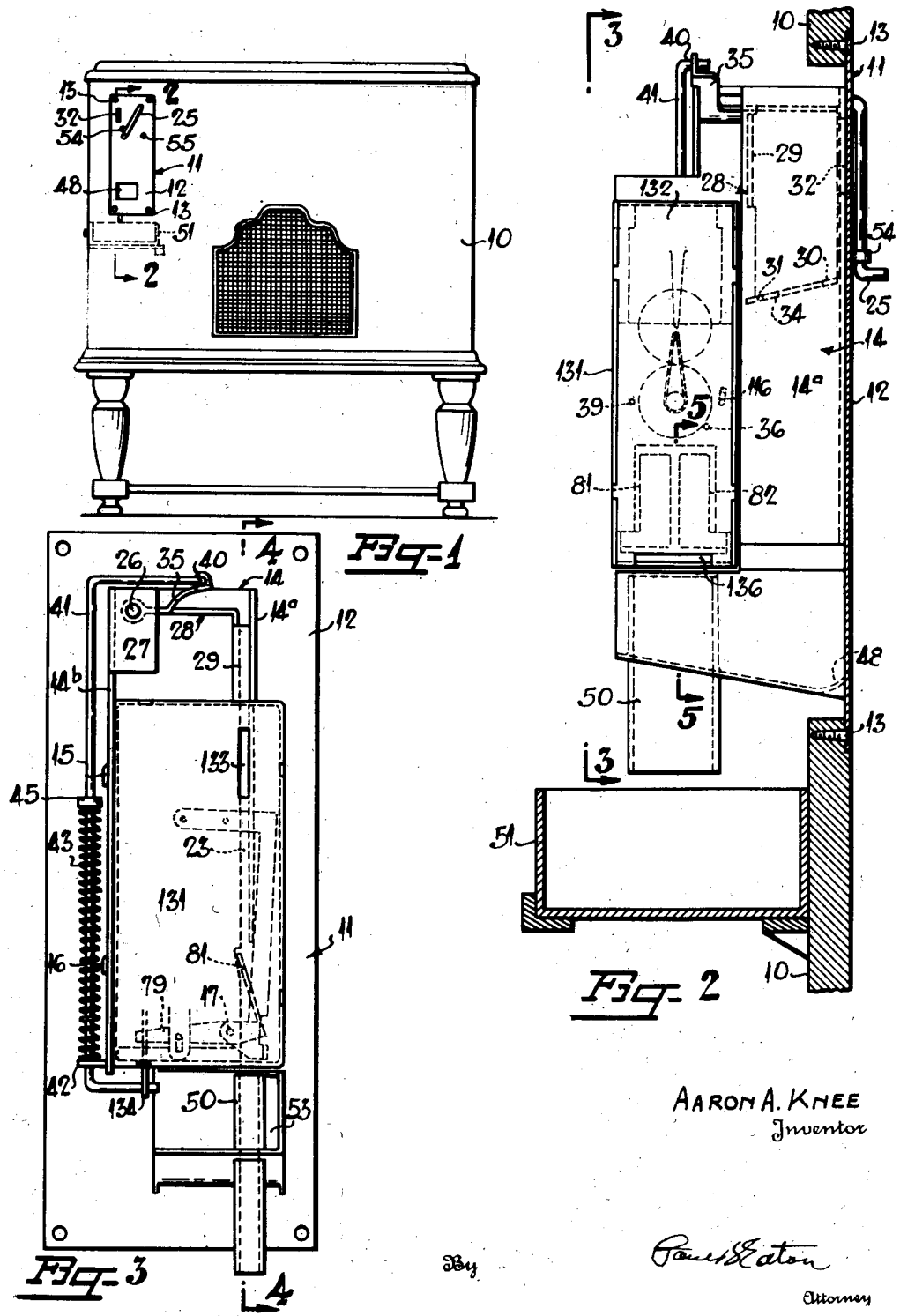
AARON A. KNEE
Inventor

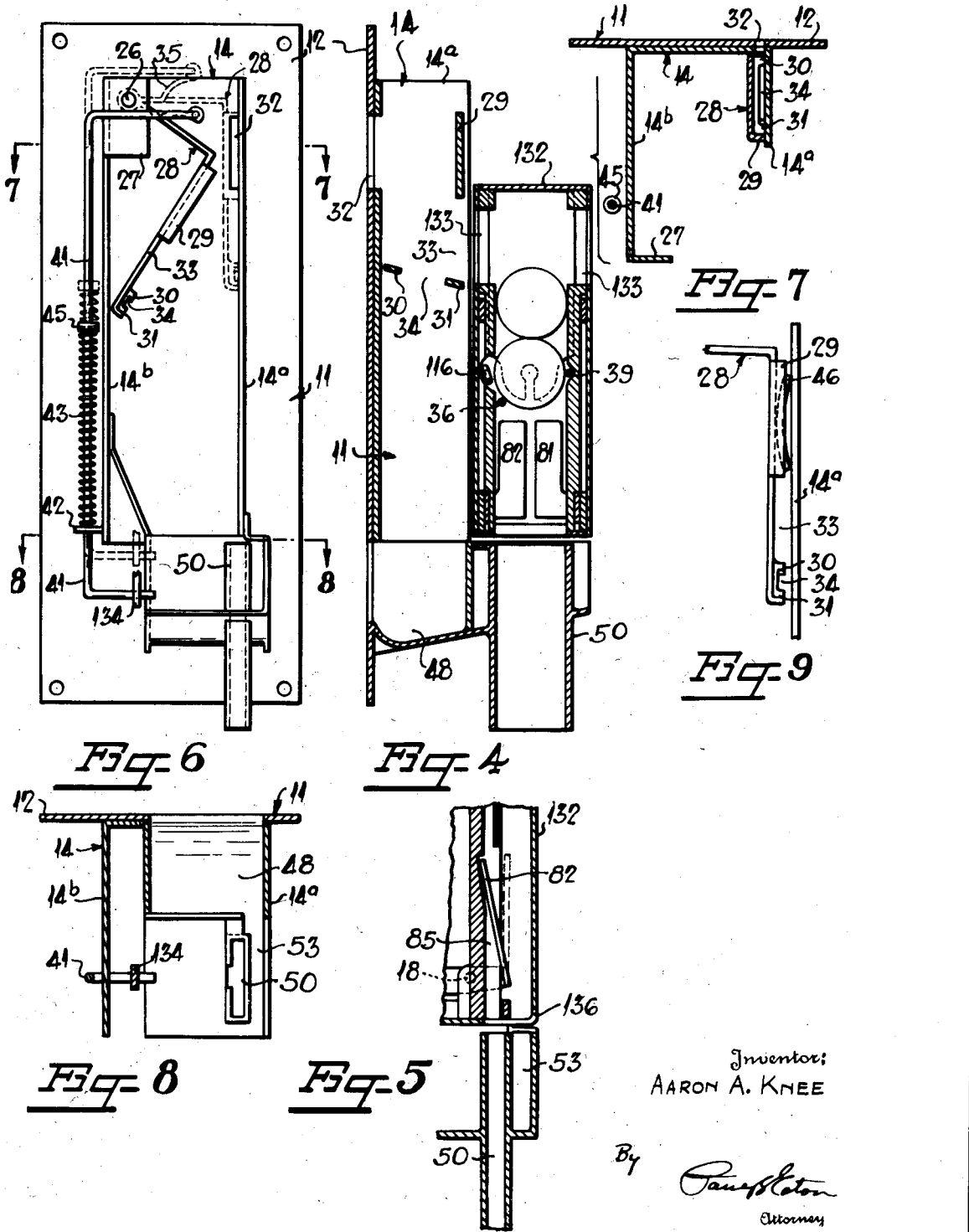

Patented Mar. 2, 1937

2,072,505

UNITED STATES PATENT OFFICE 2,072,505

ANTICLOG MEANS FOR CHECK CONTROLLED APPARATUS

Aaron A. Knee, Charlotte, N. C., assignor to Vanak Corporation, Charlotte, N. C., a corporation of North Carolina Application December 5, 1935, Serial No. 53,036

1 Claim. (Cl. 194—97)

This invention relates to a check control apparatus and more especially to a scavenger mechanism adapted to be operated in combination with a check testing apparatus for preventing bent slugs, irregularly shaped checks, pieces of paper and all other foreign objects, which normally could not be received by the testing apparatus from entering and blocking the passageway into the check testing apparatus.

This invention is shown in the drawings in combination with a check testing apparatus which is shown more fully in detail in my co-pending patent application, Serial No. 32,420, filed July 20, 1935. The reference characters referring to the parts of the check testing apparatus are identical to the ones shown referring to like parts in my co-pending patent application. While the invention is shown operating in connection with a check testing apparatus, as disclosed in said patent application, it is evident that it can be used in combination with any check testing apparatus or with any check controlled machine to prevent the coin passageway from becoming blocked by slugs and all other foreign objects which will not normally operate the check operated machine.

It is, therefore, an object of this invention to provide a scavenger mechanism adapted to receive coins or slugs prior to their entrance into the check testing apparatus or into a check controlled apparatus and to return to the depositor any of said coins or slugs or foreign objects which normally could not be received by the check testing apparatus or check controlled apparatus without blocking the passageway thereto or rendering the apparatus inoperative.

Heretofore, slugs and other foreign objects when deposited in a check controlled apparatus have rendered such inoperative and necessitated visitation by a service man after a long delay, thus resulting in serious financial loss to the operator. My scavenger eliminates this inconvenience and loss of revenue.

Some of the objects of the invention having been stated, other objects will appear as the description proceeds, when taken in connection with the accompanying drawings, in which:—

Figure 1 shows an elevation of check controlled apparatus such as a phonograph cabinet with the invention applied thereto;

Figure 2 is a vertical sectional view taken along line 2—2 in Figure 1;

Figure 3 is a rear elevation taken along line 3—3 in Figure 2 with the parts of the phonograph cabinet being omitted;

Figure 4 is a vertical sectional view taken along line 4—4 in Figure 3;

Figure 5 is a vertical sectional view taken along 5—5 in Figure 2;

Figure 6 is a view similar to Figure 3 but omitting the check testing apparatus and showing the parts in different positions;

Figure 7 is a sectional plan view taken along line 7—7 in Figure 6, but with member 28 in the position shown in Figure 3;

Figure 8 is a sectional plan view taken along line 8—8 in figure 6;

Figure 9 is an elevation of the upper right-hand portion of Figure 6 showing a bent slug inserted in the scavenger apparatus.

Referring more specifically to the drawings the numeral 10 denotes a check controlled apparatus such as a phonograph having secured thereto my scavenging apparatus 11 which comprises plate member 12 secured in the face of said cabinet by any suitable means such as screws 13. Secured to the back side of plate 12 by any suitable means, such as soldering or welding, is a U-shaped channel member 14. A check testing apparatus 131, which is fully shown and described in my co-pending patent application Ser. No. 32,420, is fastened as at 15 and 16 to outstanding leg 140b of member 14, the parts of the check testing apparatus being designated with identical reference characters in the drawings as in the co-pending application.

The check testing apparatus is removably secured in the scavenging apparatus by means of projections 15 and 16 having enlarged heads penetrating bayonet slots (not shown) in the portion 14b.

An operating lever has a horizontal portion 26 which is mounted for oscillation in the front plate 12 of U-shaped member 14, and in the lug 27 of U-shaped member 14. Fixedly secured to horizontal portion 26 of lever 25 is an angle plate member 28 having projections 29, 30, and 31 integral with the downwardly extending leg thereof, which normally engage the interior surface of outstanding leg 14a of the U-shaped member 14. The front plate 12 and the U-shaped member 14 have a slot 32 cut therein through which a coin or slug may be inserted. After the coin passes through this slot it falls into a guideway formed by sidewall 14a, portion 28 and projection 29. Projections 30 and 31 arrest the falling movement of the check or slug.

It will be noted that there is a notch 33 between the projections 29 and 31 which is of proper size to allow a properly sized check or coin to pass therethrough and enter slot 133 in the check testing apparatus.

Another notch 34 is provided between the projections 30 and 31 which normally does not interfere with the travel of a genuine coin. Neither will this notch interfere with a coin which is not genuine but of such a size that it will not block the entrance of the testing apparatus. For example, should a non-circular coin or slug be inserted into slot 32 it would fall downwardly into the notch 34, where it would be lodged. If the slug should not be exactly round this notch would serve to prevent it from entering the slot 133 in the testing apparatus. However, it should be noted that the width of the passageway formed by projections 29, 30, and 31 of the downstanding leg of the angle member 28 in combination with the interior of sidewall 14a, is substantially the same as the thickness of a genuine coin; therefore when a genuine coin is dropped into the slot 32 it will not fall into the notch 34 because the notch is narrower than the thickness of the coin. Consequently the coin will roll downwardly on this inclined surface into the slot 133 of the testing apparatus.

The angle member 28 has another arm 35 integral therewith and projecting upwardly therefrom to which is pivotally secured as at 40 a U-shaped rod 41, said rod 41 extending laterally from pivot point 40, then makes a right angle turn and extends downwardly and, is slidably confined in projection 42 extending outwardly from the lower end of member 14b.

The lower horizontal leg of U-shaped member 41 fits into operating lever 134 of the testing apparatus.

A compression spring 43 surrounds the vertical portion of U-shaped rod 41 and has its lower end resting upon projection 42 and its upper end normally engaging a collar 45 adjustably fixed on rod 41. This compression spring normally holds the angle member 28 against the sidewall 14a of U-shaped member 14 or in the dotted line position shown in Figure 6.

Each time a coin, which is of a proper size and thickness is inserted into the slot 32 it immediately falls downwardly and strikes projections 30 and 31 and enters the check testing apparatus through slot 133.

Let us assume that a bent slug or coin 46 (Fig. 9) is inserted through slot 32 under pressure. Instead of falling downwardly as a genuine coin would fall, this coin will press against the downwardly extending leg of angle member 28 and force it to a partially opened position as shown in Figure 9. It is evident that the coin in this position cannot possibly reach the testing apparatus since it is resiliently pressed against member 14a. When the operating lever 25 is rotated in a counter-clockwise manner in Figure 1, to operate the check testing apparatus through U-shaped rod 41 to test a check, the angle member 28 will be thrown to the position shown in full lines in Figure 6 to allow the bent coin 46 to drop downwardly into return receptacle 48. If this coin should be fed directly into the slot 133, the machine would be jammed, and it would be impossible to operate the same without first getting a service man to remove the bent slug. By using this device several bent or irregularly shaped coins can be fed into the slot 32, but they will not be allowed to reach the check testing entrance 133.

When a genuine coin or check is inserted into the slot 32, it immediately passes into check testing entrance 133 and is tested by the check testing appartus upon movement of handle 25. If it conforms in all respects to a genuine coin or check when the lever 25 is operated, the deflector members 81 and 82 will be rotated to dotted line position (Fig. 5) to allow the coin to pass downwardly through passageway 85, then through guideway 50 and into cash drawer 51. Should the coin or check be of such a size that it will be allowed to roll into the slot 133 but would not conform in every respect to a genuine coin then the deflector members 81 and 82 will remain in full line position shown in Figure 5 when the levers 25 and 134 are operated. The coin or check would therefore be deflected downwardly into passageway 53 from whence it rolls into the receptacle 48.

Pins 54 and 55 are secured in front plate 12 to limit the rotary movement of operating lever 25.

The check testing apparatus 131 has two slots 133 but only one is used when it is operated in combination with the present showing of the invention; however where an opposite hand model of the invention is constructed the testing apparatus 131 is reversed, thereby causing the other slot 133 to come into use.

It is also evident that pieces of paper, scraps of sheet metal and many other objects cannot enter the check testing apparatus but will be arrested by the member 28 and be returned to the depositor without harm to the check testing apparatus or to the operative parts of the check controlled apparatus should a check testing apparatus be dispensed with.

By opposite hand model is meant where the member 28 is pivoted at 26 in the upper right-hand corner of Figure 6 instead of the left-hand corner.

It is, therefore, seen that I have provided an apparatus which will apply a preliminary test to coins, slugs and the like and reject the same where they are of such a shape or size as to become lodged in the passageway of the check testing apparatus if inserted directly therein.

In the drawings and specification there has been set forth a preferred embodiment of the invention, and although specific terms are employed, they are used in a generic and descriptive sense only, and not for purposes of limitation, the scope of the invention being set forth in the appended claim.

I claim:

In a check testing apparatus, a chute for guiding a check into the apparatus, means for applying pressure to the check for testing the same, one of the sidewalls of the chute being swingably mounted for movement away from the other sidewall, said swingable sidewall having an opening in one of its edges to permit the check to pass therethrough into the testing apparatus, said swingable sidewall having a pair of spaced projections on the lower end thereof for stopping the fall of an inserted check and directing it into the apparatus, said projections being spaced apart from each other far enough to allow under-sized checks of a predetermined size to pass therethrough and also serving to arrest a non-circular object, and means connected to the swingably mounted sidewall and the means for applying pressure to the check for swinging said swingably mounted sidewall away from the other sidewall of the chute for returning any obstructing object in the chute to the exterior of the apparatus upon operation of the means for applying pressure to the check.

AARON A. KNEE.